(12) United States Patent
Ju et al.

(10) Patent No.: US 12,467,085 B2
(45) Date of Patent: Nov. 11, 2025

(54) HIGH ACCURACY NANOPORE-BASED SINGLE MOLECULE SEQUENCING BY SYNTHESIS WITH TAGGED NUCLEOTIDES

(71) Applicants: Jingyue Ju, Englewood Cliffs, NJ (US); Carl W. Fuller, Berkeley Heights, NJ (US); Shiv Kumar, Belle Mead, NJ (US); Sergey Kalachikov, Bronx, NY (US); Xiaoxu Li, New York, NY (US); Irina Morozova, Bronx, NY (US); James Russo, New York, NY (US); Steffen Jockusch, New York, NY (US)

(72) Inventors: Jingyue Ju, Englewood Cliffs, NJ (US); Carl W. Fuller, Berkeley Heights, NJ (US); Shiv Kumar, Belle Mead, NJ (US); Sergey Kalachikov, Bronx, NY (US); Xiaoxu Li, New York, NY (US); Irina Morozova, Bronx, NY (US); James Russo, New York, NY (US); Steffen Jockusch, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 1079 days.

(21) Appl. No.: 17/436,513

(22) PCT Filed: Mar. 5, 2020

(86) PCT No.: PCT/US2020/021253
§ 371 (c)(1),
(2) Date: Sep. 3, 2021

(87) PCT Pub. No.: WO2020/181129
PCT Pub. Date: Sep. 10, 2020

(65) Prior Publication Data
US 2022/0177959 A1    Jun. 9, 2022

Related U.S. Application Data

(60) Provisional application No. 62/815,250, filed on Mar. 7, 2019.

(51) Int. Cl.
*C12Q 1/68*  (2018.01)
*C12Q 1/6869*  (2018.01)

(52) U.S. Cl.
CPC ................. *C12Q 1/6869* (2013.01)

(58) Field of Classification Search
CPC .................................................. C12Q 1/6869
See application file for complete search history.

(56) References Cited

U.S. PATENT DOCUMENTS

| 9,399,217 | B2 | 7/2016 | Esfandyarpour |
| 12,188,086 | B2 | 1/2025 | Ju |
| 2010/0075332 | A1 | 3/2010 | Patel et al. |
| 2013/0280700 | A1 | 10/2013 | Ju et al. |
| 2014/0364324 | A1 | 12/2014 | Turner et al. |
| 2022/0213542 | A1* | 7/2022 | Ju ..................... C12Q 1/6869 |
| 2022/0372061 | A1 | 11/2022 | Ju |

FOREIGN PATENT DOCUMENTS

| CA | 3 049 667 | 7/2018 |
| WO | WO 2004/074503 A2 | 9/2004 |
| WO | WO 2017/058953 A1 | 4/2017 |
| WO | WO 2017/176677 A1 | 10/2017 |
| WO | WO-2017205336 A1 * | 11/2017 ......... A61K 31/7052 |
| WO | WO 2018/035134 A1 | 2/2018 |
| WO | WO 2018/125759 A1 | 7/2018 |
| WO | WO 2018/183538 A1 | 10/2018 |
| WO | WO 2019/178393 A1 | 9/2019 |

OTHER PUBLICATIONS

International Preliminary Report on Patentability issued Aug. 25, 2021, including Written Opinion of the International Searching Authority issued Jul. 2, 2020, in connection with PCT International Application No. PCT/US2020/021253.
Chen et al. "The History and Advances of Reversible Terminators Used in New Generations of Sequencing Technology", Genomics Proteomics Bioinformatics, 2013, vol. 11, pp. 34-40.
Fuller et al. "Real-time single-molecule electronic DNA sequencing by synthesis using polymer-tagged nucleotides on a nanopore array", PNAS, 2016, vol. 113 (19), pp. 5233-5238.
International Search Report issued Jul. 2, 2020 in connection with PCT International Application No. PCT/US2020/021253.
Written Opinion (form PCT/ISA/237) issued Jul. 2, 2020 in connection with PCT International Application No. PCT/US2020/021253.
Ren Jianyi: "Design and Synthesis of Novel Cleavable Fluorescent Nucleotide Reversible Terminators Using Disulfide Linkers for DNA Sequencing by Synthesis", Thesis, Jan. 1, 2018 (Jan. 1, 2018).
Jia Guo et al: "An Integrated System for DNA Sequencing by Synthesis Using Novel Nucleotide Analogues", Accounts of Chemical Research, vol. 43, No. 4, Apr. 20, 2010 (Apr. 20, 2010), pp. 551-563.
Nov. 25, 2022 Communication pursuant to Rule 62 EPC issued in connection with counter part European Application No. 20766054.9.

* cited by examiner

*Primary Examiner* — Kenneth R Horlick
(74) *Attorney, Agent, or Firm* — Gary J. Gershik

(57) ABSTRACT

Disclosed herein are highly accurate approaches for single molecule electronic nanopore-based SBS.

20 Claims, 8 Drawing Sheets

HIGH ACCURACY NANOPORE-BASED SINGLE MOLECULE SEQUENCING BY SYNTHESIS WITH TAGGED NUCLEOTIDES

CROSS-REFERENCE TO RELATED APPLICATIONS

This application is a § 371 national stage of PCT International Application No. PCT/US2020/021253, filed Mar. 5, 2020 claiming the benefit of U.S. Provisional Application No. 62/815,250, filed Mar. 7, 2019, the entire contents of each of which are hereby incorporated by reference into the subject application.

Throughout this application, various publications and patents are referenced. Full citations for these references may be found at the end of the specification immediately preceding the claims. The disclosures of these publications and patents in their entirety are hereby incorporated by reference into this application to more fully describe the state of the art to which this invention pertains.

BACKGROUND OF THE INVENTION

DNA sequencing is a fundamental tool in biological and medical research, and is especially important for the paradigm of personalized medicine. Various new DNA sequencing methods have been investigated with the aim of eventually realizing the goal of the $1,000 genome; the dominant method is sequencing by synthesis (SBS), an approach that determines DNA sequences during the polymerase reaction (Hyman 1988; Ronaghi et al. 1998; Ju et al. 2003; Li 2003; Braslaysky et al. 2003; Ruparel et al. 2005; Margulies et al. 2005; Ju et al. 2006; Wu et al. 2007; Guo et al. 2008; Bentley et al. 2008; Harris et al. 2008; Eid et al. 2009; Rothberg et al. 2011).

Disclosed herein are highly accurate single molecule electronic nanopore-based SBS approaches.

BRIEF SUMMARY OF THE INVENTION

Disclosed herein is a method for sequencing a nucleic acid molecule, the method comprising:
  (a) providing a chip comprising a plurality of individually addressable nanopores, wherein an individually addressable nanopore of said plurality of individually addressable nanopores comprises a nanopore in a membrane that is disposed adjacent to an electrode, wherein said nanopore is linked to a nucleic acid polymerase, and wherein each individually addressable nanopore is adapted to select a tag attached to a tagged nucleotide;
  (b) directing said nucleic acid template molecule adjacent to or in proximity to said nanopore along with a nucleic acid primer complementary to a portion of said nucleic acid template molecule;
  (c) providing four types of unincorporable tagged nucleotides (A, C, G, T) and four types of incorporable tagged nucleotides (A, C, G, T) into a reaction chamber comprising each individual said nanopore,
    wherein each type of the unincorporable tagged nucleotides comprises a different tag, such that each tag, when captured in said nanopore, elicits a distinct ionic current blockade signal, and wherein each incorporable tagged nucleotide comprises a single fifth tag, which is distinct from the four tags on the unincorporable tagged nucleotides, and which produces a fifth unique ionic current blockade signal;
  (d) carrying out a polymerization reaction with the aid of a polymerase;
  (e) detecting the tag on any unincorporable tagged nucleotide that binds to the nucleic acid molecule with the aid of said electrode, which event will occur multiple times consecutively, when such unincorporable tagged nucleotides bind and when such tag is captured within the channel of said nanopore;
  (f) detecting the tag on any incorporable tagged nucleotide that binds to the nucleic acid molecule with the aid of said electrode, which event will occur one time, wherein the tag is detected prior to its being released from said individual nucleotide as the nucleotide is polymerized along said nucleic acid molecule to generate a strand that is complementary to at least a portion of said nucleic acid molecule, when such tag is captured within the channel of said nanopore;
  (g) repeating (e) and (f) as long as the polymerization along the said nucleic acid molecule continues,
  thereby obtaining the sequence of said nucleic acid molecule.

Disclosed herein is also a method for sequencing a nucleic acid molecule, the method comprising:
  (a) providing a chip comprising a plurality of individually addressable nanopores, wherein an individually addressable nanopore of said plurality of individually addressable nanopores comprises a nanopore in a membrane that is disposed adjacent to an electrode, wherein said nanopore is linked to a nucleic acid polymerase, and wherein each individually addressable nanopore is adapted to select a tag attached to a tagged unincorporable nucleotide from a set of four possible separately tagged unincorporable nucleotides;
  (b) directing said nucleic acid molecule adjacent to or in proximity to said nanopore along with a nucleic acid primer complementary to a portion of said nucleic acid template molecule;
  (c) providing four types of unincorporable tagged nucleotides (A, C, G, T) and four types of untagged nucleotide reversible terminators (A, C, G, T) into a reaction chamber comprising each individual said nanopore;
    wherein each type of the unincorporable tagged nucleotides comprises a different tag, such that each tag, when captured in said nanopore, elicits a distinct ionic current blockade signal;
  (d) carrying out a polymerization reaction with the aid of a polymerase;
  (e) detecting the tag on any unincorporable tagged nucleotide that binds to the nucleic acid molecule with the aid of said electrode, which event will occur multiple times, when such unincorporable tagged nucleotides bind and when such tag is captured within the channel of said nanopore, until an untagged nucleotide reversible terminator is bound and is polymerized to the primer strand along said nucleic acid molecule to generate a strand that is complementary to at least a portion of said nucleic acid molecule;
    wherein said nucleotide reversible terminators have a blocking group at the 3' hydroxyl position;
  (f) cleaving the 3' blocking group on said polymerized nucleotide reversible terminator in such a way as to regenerate the 3' hydroxyl group on said nucleotide reversible terminator;
  (g) repeating (c) to (f) as long as the polymerization along the said nucleic acid molecule continues,
  thereby obtaining the sequence of said nucleic acid molecule.

Disclosed herein is also a method for sequencing a nucleic acid molecule, the method comprising:

(a) providing a chip comprising a plurality of individually addressable nanopores, wherein an individually addressable nanopore of said plurality of individually addressable nanopores comprises a nanopore in a membrane that is disposed adjacent to an electrode, wherein said nanopore is linked to a nucleic acid polymerase, and wherein each individually addressable nanopore is adapted to select a tag attached to a tagged nucleotide reversible terminator from a set of four possible separately tagged nucleotide reversible terminators (A, C, G and T) bearing tags 1, 2, 3 and 4 respectively;
wherein said tagged nucleotide reversible terminators have a blocking group at the 3' hydroxyl position, and said tag at the terminal phosphate position;

(b) directing said nucleic acid molecule adjacent to or in proximity to said nanopore along with a nucleic acid primer complementary to a portion of said nucleic acid template molecule;

(c) providing four types of tagged nucleotide reversible terminators (A, C, G, T) into a reaction chamber comprising each individual said nanopore;
wherein said nucleotide reversible terminators have a blocking group at the 3' hydroxyl position;

(d) carrying out a polymerization reaction with the aid of a polymerase;

(e) detecting the tag on any unincorporable tagged nucleotide that binds to the nucleic acid molecule with the aid of said electrode, when such unincorporable tagged nucleotides bind and when said tag is captured within the channel of said nanopore, which event will reveal the specific nucleotide reversible terminator polymerized along said nucleic acid molecule;

(f) cleaving the 3' blocking group on said polymerized nucleotide reversible terminator in such a way as to regenerate the 3' hydroxyl group on said nucleotide reversible terminator;

(g) repeating (c) to (f) as long as the polymerization along the said nucleic acid molecule continues, thereby obtaining the sequence of said nucleic acid molecule.

Disclosed herein is also a method for sequencing a nucleic acid molecule, the method comprising:

(a) providing a chip comprising a plurality of individually addressable nanopores, wherein an individually addressable nanopore of said plurality of individually addressable nanopores comprises a nanopore in a membrane that is disposed adjacent to an electrode, wherein said nanopore is linked to a nucleic acid polymerase, and wherein each individually addressable nanopore is adapted to select a tag attached to a tagged nucleotide reversible terminator from a set of four possible separately tagged nucleotide reversible terminators (A, C, G and T) bearing tags 1, 2, 3 and 4 respectively;
wherein said tagged nucleotide reversible terminators have a blocking group at the 3' hydroxyl position, and said tag on the base, and wherein said tag is attached to the 5-position of a pyrimidine base or the 7 position of a purine base via a cleavable linker;

(b) directing said nucleic acid molecule adjacent to or in proximity to said nanopore along with a nucleic acid primer complementary to a portion of said nucleic acid template molecule;

(c) providing four types of tagged nucleotide reversible terminators (A, C, G, T) into a reaction chamber comprising each individual said nanopore;
wherein said nucleotide reversible terminators have a blocking group at the 3' hydroxyl position;

(d) carrying out a polymerization reaction with the aid of a polymerase;

(e) detecting the tag on any unincorporable tagged nucleotide that binds to the nucleic acid molecule with the aid of said electrode, when such unincorporable tagged nucleotides bind and when said tag is captured within the channel of said nanopore, which event will reveal the specific nucleotide reversible terminator polymerized along said nucleic acid molecule;

(f) cleaving the 3' blocking group on said polymerized nucleotide reversible terminator in such a way as to regenerate the 3' hydroxyl group on said nucleotide reversible terminator, and at the same time cleaving the tag from the base;

(g) repeating (c) to (f) as long as the polymerization along the said nucleic acid molecule continues, thereby obtaining the sequence of said nucleic acid molecule.

DETAILED DESCRIPTION OF THE INVENTION

Figure 1:
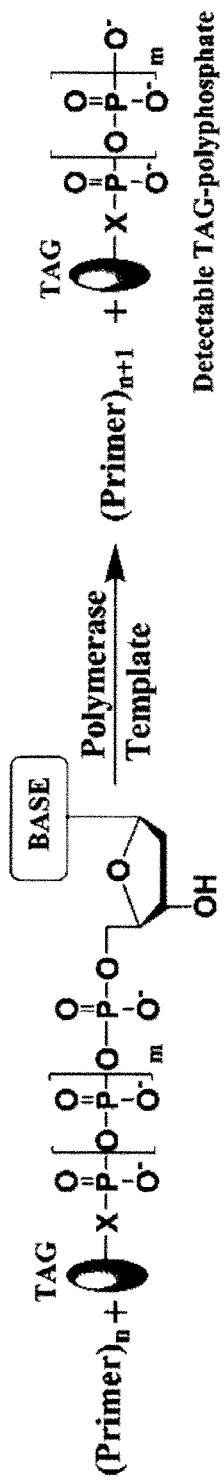
FIG. 1: Mechanism of primer extension by a tagged nucleotide and release of tag-polyphosphate. m=1-8.

While various embodiments of the invention are shown and described herein, it will be obvious to those skilled in the art that such embodiments are provided by way of example only. Numerous variations, changes, and substitutes may occur without departing from the disclosed invention. It should be understood that various alternatives to the embodiments of the invention described herein may be employed.

Some of the inventors named on this application have previously patented and published a method of single molecule electronic nanopore-based sequencing by synthesis (Nanopore SBS) (Ju 2014; Ju et al. 2017; Ju, Davis, Chen 2015; Kumar et al. 2012) in which distinct nanopore detectable tags were placed on each of the four nucleotides. These were attached to the polyphosphates of the nucleotides such that upon incorporation these tags are released along with all but the α-phosphate of the polyphosphate. By detecting the signal due to the ionic current blockade in the nanopore due to the passage of the 4 distinct tags associated with the polymerase reaction, DNA sequences can be determined.

To maximize signal detection, an approach was developed in which the incorporation rate (rate 1) was even slower relative to the rate of tag capture in the channel (rate 2) and the detection speed (rate 3) (Davis, Chen, Bibillo, Korenblum 2013; Fuller et al. 2016; Stranges et al. 2016). In this method, the tag-dependent current measurements could occur while the tagged nucleotide was still part of the ternary complex with template, primer and polymerase, and before the tag was actually released from the nucleotide during the incorporation reaction. This was accomplished by, on the one hand, (1) designing the tags to have a faster capture rate by binding the polymerase to the nanopore to bring it in very close proximity and adjusting the overall charge of the tag or amino acids in the nanopore barrel to enhance capture speed and (2) recording currents at a higher rate (close to microsecond-scale duty cycles), and on the other hand, (3) reducing the polymerase reaction rate (close to millisecond scale) by adjusting the ratio of non-catalytic to catalytic metal ions or by other means. Under these conditions, multiple measurements are made while each nucleotide is bound to the ternary complex.

Although this approach has resulted in good single molecule electronic sequencing by synthesis results, the stochastic nature of single molecule polymerase reactions still results in a small but significant percentage of miscalls, predominantly insertions and deletions, due to inappropriate synchronization of the above 3 rates. Thus if rate 1 was occasionally faster than rates 2+3, there would be failure to call a base (deletion artifact), while if rate 3 was much faster than rate 1, the software might mistakenly call an extra base (insertion artifact), and these types of errors would be especially pronounced in homopolymeric stretches of DNA.

To overcome these issues, there are a number of steps that can be taken in addition to those alluded to above. In previously described SBS approaches involving fluorescent detection, for instance, nucleotide reversible terminators bearing one of 4 fluorescent tags attached to the 4 respective bases and blocked 3'-OH groups on the sugar allow only a single nucleotide to be determined in each cycle of incorporation, essentially pausing the sequencing. Only after a cleavage reaction is performed to remove the fluorescent tag and to restore the 3'-OH group, can the next fluorescently labeled nucleotide be added (Ju, Kim, Bi, Meng, Li 2011; Ju, Cao, Li, Meng, Guo, Zhang 2014; Ju, Li, Edwards, Itagaki 2012). Thus unlike continuous (real-time) sequencing methods, such a method is extremely accurate, despite requiring an extra cleavage step. A similar approach for single molecule electronic nanopore-based DNA sequencing was described in a patent application naming several of the inventors listed on the subject application (Ju et al. 2017). In that method, the attachment of anchor molecules to 3' blocked nucleotides via their 3' blocking group, followed by labeling with nanopore-detectable tags linked to anchor-binding molecules. The 2-step incorporation/labeling step is required since the presence of a directly-attached long tag at the 3' position is expected to inhibit incorporation with all commercially available polymerases. After recording ionic current signals due to the entry of the nanopore tag into the nanopore channel, the tag and blocking group are removed in a single step, in preparation for the subsequent sequencing step. Depending on the number of anchors used, one, two or more tags can be utilized, so long as there is a multiplicity of cleavable linkers connecting these anchors/tags to the 3'-OH group. (More specifically, the combination of anchors and cleavable linkers will determine whether 1, 2 or more tags are required. Thus, if the four bases have an orthogonal set of two cleavable linkers and two anchors, a single tag will be sufficient; with 1 cleavable linker and 2 anchors, or 2 cleavable linkers and 1 anchor, 2 tags are necessary. With four tags, no anchors and only a single cleavable linker are required.) The advantage of attaching the tag at the 3' position of the nucleotides is (1) to maintain the tag in the nanopore as long as desired for recording measurements; and (2) to produce extended primers bearing only natural nucleotides, allowing long reads.

Disclosed herein are three additional highly accurate approaches for single molecule electronic nanopore-based SBS. The first approach takes advantage of the nanopore-tag containing nucleotide analogues, which can bind to the ternary complex but cannot be incorporated into DNA such as those containing carbons instead of oxygens between their α and β phosphate groups, or having S groups on the α phosphate. These unincorporable nucleotides (UINs) can inhibit the polymerase reaction in much the same way that non-catalytic metal ions do, thereby providing sufficient time to accurately determine the current blockade elicited by the tag associated with each UIN. In a version of this first approach, a mixture of predominantly tagged UINs containing 4 different tags and a smaller proportion of dNTPs containing a 5th non-specific tag are used for real-time nanopore sequencing. The bases are determined by the tags on the unincorporable nucleotides and the 5th tag on the incorporable dNTP demarcates the cycles, decreasing insertion/deletion artifacts and thereby increasing the method's accuracy. In the second approach, including tagged UINs and untagged nucleotide reversible terminators (NRTs), there is no need for the 5th tag on the NRTs but a cleavage step is required in each cycle to restore the 3'-OH group; thus this approach is a stop-and-go, not a continuous Nanopore SBS method. In the third approach, tagged NRTs with tags positioned on their terminal phosphate groups (or their bases) are described and there is a need to include some non-catalytic metal ions along with the catalytic metal ions to obtain sufficiently long signals. This stop-and-go approach is similar to the one disclosed in a previous patent application naming several of the inventors named on the subject application and described in the previous paragraph, but does not require anchors and a tag labeling step. (A variant of this third approach is described where the presence of the tags on the bases may serve as blocking groups for further incorporation, acting as virtual terminators (Siddiqi 2011)). All these methods will be described in greater detail herein.

Terms

As used herein, and unless stated otherwise, each of the following terms shall have the definition set forth below.
A—Adenine;
C—Cytosine;
G—Guanine;
T—Thymine;
U—Uracil;
DNA—Deoxyribonucleic acid;
RNA—Ribonucleic acid;

"Nucleic acid" shall mean, unless otherwise specified, any nucleic acid molecule, including, without limitation, DNA, RNA and hybrids thereof. In an embodiment the nucleic acid bases that form nucleic acid molecules can be the bases A, C, G, T and U, as well as derivatives thereof.

"Derivatives" or "analogues" of these bases are well known in the art, and are exemplified in PCR Systems, Reagents and Consumables (Perkin Elmer Catalogue 1996-1997, Roche Molecular Systems, Inc., Branchburg, New Jersey, USA).

A "nucleotide residue" is a single nucleotide in the state it exists after being incorporated into, and thereby becoming a monomer of, a polynucleotide. Thus, a nucleotide residue is a nucleotide monomer of a polynucleotide, e.g. DNA, which is bound to an adjacent nucleotide monomer of the polynucleotide through a phosphodiester bond at the 3' position of its sugar and is bound to a second adjacent nucleotide monomer through its phosphate group, with the exceptions that (i) a 3' terminal nucleotide residue is only bound to one adjacent nucleotide monomer of the polynucleotide by a phosphodiester bond from its phosphate group, and (ii) a 5' terminal nucleotide residue is only bound to one adjacent nucleotide monomer of the polynucleotide by a phosphodiester bond from the 3' position of its sugar.

Because of well-understood base-pairing rules, determining the identity (of the base) of dNPP analogue (or rNPP analogue) incorporated into a primer or DNA extension product (or RNA extension product) by measuring the unique electrical signal of the tag translocating through the nanopore, and thereby the identity of the dNPP analogue (or rNPP analogue) that was incorporated, permits identification of the complementary nucleotide residue in the single stranded polynucleotide that the primer or DNA extension product (or RNA extension product) is hybridized to. Thus, if the dNPP analogue that was incorporated comprises an adenine, a thymine, a cytosine, or a guanine, then the complementary nucleotide residue in the single stranded DNA is identified as a thymine, an adenine, a guanine or a cytosine, respectively. The purine adenine (A) pairs with the pyrimidine thymine (T). The pyrimidine cytosine (C) pairs with the purine guanine (G). Similarly, with regard to RNA, if the rNPP analogue that was incorporated comprises an adenine, a uracil, a cytosine, or a guanine, then the complementary nucleotide residue in the single stranded RNA is identified as a uracil, an adenine, a guanine or a cytosine, respectively.

Incorporation into an oligonucleotide or polynucleotide (such as a primer or DNA extension strand) of a dNPP or rNPP analogue means the formation of a phosphodiester bond between the 3' carbon atom of the 3' terminal nucleotide residue of the polynucleotide and the 5' carbon atom of the dNPP analogue or rNPP analyze, respectively.

"Substrate" or "Surface" shall mean any suitable medium present in the solid phase to which a nucleic acid or an agent may be affixed. Non-limiting examples include chips, beads, nanopore structures and columns. In an embodiment the solid substrate can be present in a solution, including an aqueous solution, a gel, or a fluid.

"Hybridize" shall mean the annealing of one single-stranded nucleic acid to another nucleic acid based on the well-understood principle of sequence complementarity. In an embodiment the other nucleic acid is a single-stranded nucleic acid. The propensity for hybridization between nucleic acids depends on the temperature and ionic strength of their milieu, the length of the nucleic acids and the degree of complementarity. The effect of these parameters on hybridization is well known in the art (see Sambrook J, Fritsch E F, Maniatis T. 1989. Molecular cloning: a laboratory manual. Cold Spring Harbor Laboratory Press, New York). As used herein, hybridization of a primer sequence, or of a DNA extension product, to another nucleic acid shall mean annealing sufficient such that the primer, or DNA extension product, respectively, is extendable by creation of a phosphodiester bond with an available nucleotide or nucleotide analog capable of forming a phosphodiester bond.

As used herein, unless otherwise specified, a base which is "unique" or "different from" another base or a recited list of bases shall mean that the base has a different structure from the other base or bases. For example, a base that is "unique" or "different from" adenine, thymine, and cytosine would include a base that is guanine or a base that is uracil.

As used herein, unless otherwise specified, a label or tag moiety which is "different" from the label or tag moiety of a referenced molecule means that the label or tag moiety has a different chemical structure from the chemical structure of the other/referenced label or tag moiety.

As used herein, unless otherwise specified, "primer" means an oligonucleotide that upon forming a duplex with a polynucleotide template, is capable of acting as a point of polymerase incorporation and extension from its 3' end along the template, thereby resulting in an extended duplex.

As used herein, "alkyl" includes both branched and straight-chain saturated aliphatic hydrocarbon groups having the specified number of carbon atoms and may be unsubstituted or substituted. Thus, C1-Cn as in "C1-Cn alkyl" includes groups having 1, 2, . . . , n−1 or n carbons in a linear or branched arrangement. For example, a "C1-C5 alkyl" includes groups having 1, 2, 3, 4, or 5 carbons in a linear or branched arrangement, and specifically includes methyl, ethyl, n-propyl, isopropyl, n-butyl, t-butyl, and pentyl.

As used herein, "alkenyl" refers to a non-aromatic hydrocarbon group, straight or branched, containing at least 1 carbon to carbon double bond, and up to the maximum possible number of non-aromatic carbon-carbon double bonds may be present, and may be unsubstituted or substituted. For example, "C2-C5 alkenyl" means an alkenyl group having 2, 3, 4, or 5, carbon atoms, and up to 1, 2, 3, or 4, carbon-carbon double bonds respectively. Alkenyl groups include ethenyl, propenyl, and butenyl.

The term "alkynyl" refers to a hydrocarbon group straight or branched, containing at least 1 carbon to carbon triple bond, and up to the maximum possible number of non-aromatic carbon-carbon triple bonds may be present, and may be unsubstituted or substituted. Thus, "C2-C5 alkynyl" means an alkynyl group having 2 or 3 carbon atoms and 1 carbon-carbon triple bond, or having 4 or 5 carbon atoms and up to 2 carbon-carbon triple bonds. Alkynyl groups include ethynyl, propynyl and butynyl.

The term "substituted" refers to a functional group as described above such as an alkyl, or a hydrocarbyl, in which at least one bond to a hydrogen atom contained therein is replaced by a bond to non-hydrogen or non-carbon atom, provided that normal valencies are maintained and that the substitution(s) result(s) in a stable compound. Substituted groups also include groups in which one or more bonds to a carbon(s) or hydrogen(s) atom are replaced by one or more bonds, including double or triple bonds, to a heteroatom. Non-limiting examples of substituents include the functional groups described above, and for example, N, e.g. so as to form —CN.

Figure 5:
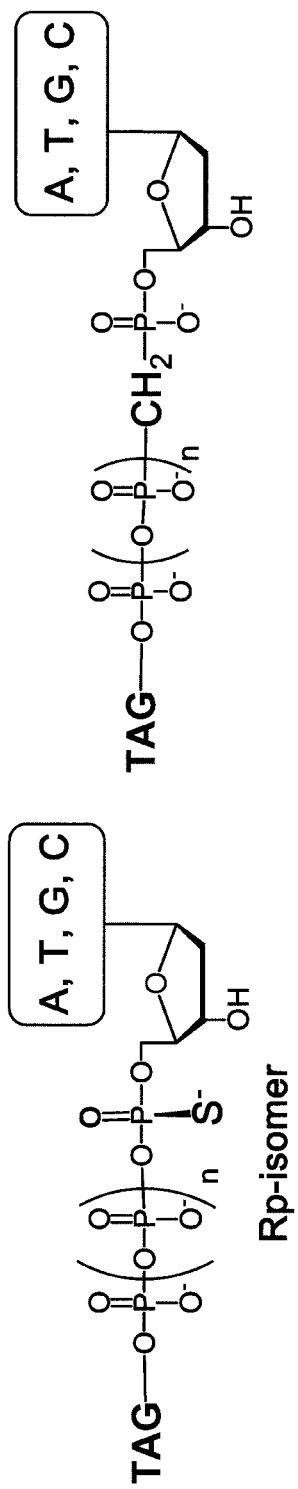
FIG. 5: Alternative unincorporable nucleotides that can be used for the single-molecule electronic nanopore-based approach shown in FIG. 1. These include the Rp isomer of α-thio-nucleoside-5'-polyphosphate (left) and α,β-methylene-nucleoside-5'-polyphosphate (right).

"Unincorporable nucleotides" (also referred to as "non-incorporable nucleotides", "UINs", or "non-hydrolyzable nucleotides") are herein described as nucleotide analogues that can bind to a primed DNA template strand in a ternary complex following the usual base pairing rules but cannot be incorporated into the growing primer strand. They consist of deoxyribose (or ribose or dideoxyribose), a nitrogenous base (purine or pyrimidine), and a modified triphosphate or polyphosphate, in which the oxygen atom connecting the α and β phosphorus or the oxygen connecting the β and γ phosphorus is replaced by a carbon or nitrogen atom, or in which a sulfur group replaces one of the oxygens on the α or β phosphorus (Rp isomer). In either case, these nucleotides cannot form a phosphodiester bond with the hydroxyl group on the preceding nucleotide in the primer strand. Two examples are shown in FIG. 5 herein.

"Nucleotide reversible terminators" (also referred to as "NRTs") are herein referred to as nucleotide analogues that can themselves be incorporated into a growing DNA strand following the usual base pairing rules but prevent incorporation of the subsequent nucleotide. Typically, these have chemical groups attached to the 3'-OH group of the sugar in such a way that they can be removed by chemical or photochemical treatment to restore the 3'-OH group (cleavable chemical groups). Examples of such cleavable groups are aziodmethyl (cleavable by TCEP, THP or other reducing agents), allyl (cleavable by Pd(0)), 2-nitrobenzyl (cleavable by ~350 nm light), and alkyldithiomethyl (cleavable by TCEP or THP). A related nucleotide analogue, referred to as a virtual terminator, has long or bulky chemical groups, sometimes containing phosphates, attached to the base that inhibit incorporation of the next nucleotide. Example structures have been provided in previous patents naming inventors among those named on the subject application, as well as in FIG. 5 herein.

"Ternary complex" (also referred to as "polymerase ternary complex"), for the purpose of this patent, is herein described as the complex containing DNA (or RNA) polymerase, DNA (or RNA) template, DNA (or RNA) primer, and incoming deoxyribonucleotide (or ribonucleotide) triphosphate complementary to the next available base in the template DNA. It is generally considered to be the stage in the polymerase reaction immediately before phosphodiester bond formation between the 3'-OH of the primer strand and the α-phosphate of the incoming nucleotide. In many of the embodiments described herein, the polymerase is covalently or otherwise tightly bound to the nanopore.

"Nanopore" is defined as a structure that has a nanoscale channel that can pass ions in solution from one side to the other. Examples of nanopores are protein nanopores (e.g., α-hemolysin and other multi-subunit porins), synthetic nanopores, and hybrid protein/synthetic nanopores. In relevant embodiments, these nanopores are inserted into a natural or artificial membrane that would otherwise serve to prevent passage of ions and other molecules. The width of the nanopore channel should allow polymers such as single stranded DNA to pass through, typically upon application of a voltage gradient across the membrane. During their transit, they will reduce the ionic current at a given voltage, due to their size, charge or other characteristics. "Nanopore" includes, for example, a structure comprising (a) a first and a second compartment separated by a physical barrier, which barrier has at least one pore with a diameter, for example, of from about 1 to 10 nm, and (b) a means for applying an electric field across the barrier so that a charged molecule such as DNA, nucleotide, nucleotide analogue, or tag, can pass from the first compartment through the pore to the second compartment. The nanopore ideally further comprises a means for measuring the electronic signature of a molecule passing through its barrier. The nanopore barrier may be synthetic or naturally occurring in part. Barriers can include, for example, lipid bilayers having therein α-hemolysin, oligomeric protein channels such as porins, and synthetic peptides and the like. Barriers can also include inorganic plates having one or more holes of a suitable size. Herein "nanopore", "nanopore barrier" and the "pore" in the nanopore barrier are sometimes used equivalently.

Nanopore devices are known in the art and nanopores and methods employing them are disclosed in U.S. Pat. Nos. 7,005,264; 7,846,738; 6,617,113; 6,746,594; 6,673,615; 6,627,067; 6,464,842; 6,362,002; 6,267,872; 6,015,714; 5,795,782; and U.S. Publication Nos. 2004/0121525, 2003/0104428, and 2003/0104428, each of which are hereby incorporated by reference in their entirety.

"Nanopore arrays" are chips containing many individual nanopores at known positions; each nanopore can be separately interrogated electronically (allowing single molecule electronic nanopore-based sequencing by synthesis).

"Nanopore-detectable tag" (also referred to as a "nanopore tag") is a molecule, usually a polymer, covalently attached to the nucleotides in a Nanopore SBS reaction. A different nanopore tag is typically attached to each nucleotide, A, C, G and T (or U), so as to elicit different ionic current blockade signals as they pass through the channel of the nanopore, when a voltage gradient is applied across the membrane.

Nanopore sequencing by synthesis (also referred to as "Nanopore SBS") refers to the approach described previously by us (Kumar et al. 2012; Fuller et al. 2016; Stranges et al. 2016) in which tags that are attached to nucleotides can be distinguished by their effect on ionic currents passing through nanopores as these modified nucleotides are added to a growing DNA strand. Measurements can be made while tagged nucleotides are still part of the ternary complex, or after their tags are released by the polymerase reaction.

"5th Tag". Typically in Nanopore SBS, four tags are required, one for each of the 4 nucleotides. The 4 tags elicit distinguishable current blockades as they pass through ion channels (nanopores) under a voltage gradient applied across the membrane in which the nanopore is embedded. In one of the embodiments described herein, 5 tags are used, each with a different ionic blockade signature. Four of these are attached to four unincorporable nucleotides, a different one to each of A, C, G and T (U). The 5th tag is attached to all four (A, C, G and T) of the incorporable nucleotides. As described herein, this combination of tagged nucleotides, in the appropriate ratios, is designed to allow very high accuracy nanopore SBS.

Several years ago, it was proposed the enhancing nucleotide discrimination by detecting polymer tags attached to the terminal phosphate of a nucleotide (Kumar et al. 2012), made possible by the ability of a nanopore to identify over 50 differently-sized PEG polymers (Reiner et al. 2010; Robertson et al. 2007). Kumar et al. first reported on the modification of nucleoside-5'-triphosphates by introducing more phosphate groups to produce tetra- and pentaphosphates and introducing a dye directly to the terminal phosphate or by attaching a linker between the terminal phosphate and the dye (Kumar et al. 2004; Nelson et al. 2006). Nucleotides with tetra- and pentaphosphates were better DNA polymerase substrates (Kumar et al. 2005), and dye-labeled hexaphosphate nucleotides have been developed by Pacific Biosciences for single molecule DNA sequencing. Following this notion, nucleoside-5'-polyphosphates were synthesized and attached PEG tags of different lengths and later, oligonucleotide tags to the terminal phosphate group (Kumar et al. 2012; Fuller et al. 2016; Fuller, Kumar, Ju, Davis, Chen 2015). The polymerase extension reaction releases polyphosphate with the tag attached (FIG. 1). It was reasoned that conducting sequencing with these tags placed in the vicinity of a nanopore would generate different signals specific to each base as they are captured by and traverse the nanopore. Discrimination of the bases of the 4 nucleotides by the nanopore is enhanced relative to nanopore strand sequencing with natural nucleotides due to the increased size, mass or charge differences of the tagged polyphosphate molecules on these nucleotide analogues. Thus, the accuracy and reliability required for base-to-base sequencing by nanopore is more easily achievable.

The sequencing engine for the single-molecule nanopore-SBS sequencing scheme implemented is shown in FIG. 1 in Fuller et al. 2016. DNA polymerase is bound covalently to the αHL nanopore. Both a template to be sequenced (plus the primer) and 4 differently tagged nucleotides are added to the solution. When the complementary nucleotide binds in the polymerase active site, its tag is captured by the nanopore, and the resulting current blockade signal identifies the tag and hence the nucleotide base. Upon incorporation, the polyphosphate product with attached tag is released. These previous methods used a set of 4 modified oligonucleotides as tags to produce distinct signatures (example set in FIG. 2 in Fuller et al. 2016).

Herein disclosed are methods using 5 distinguishable tags to improve accuracy of base calls, which will be further helped by the use of long barrel pores. In some embodiments of these methods a mixture of un-incorporable and incorporable tagged nucleotides are utilized to enhance the ability to discriminate among the tags by increasing their residence time in the pore.

Figure 2:
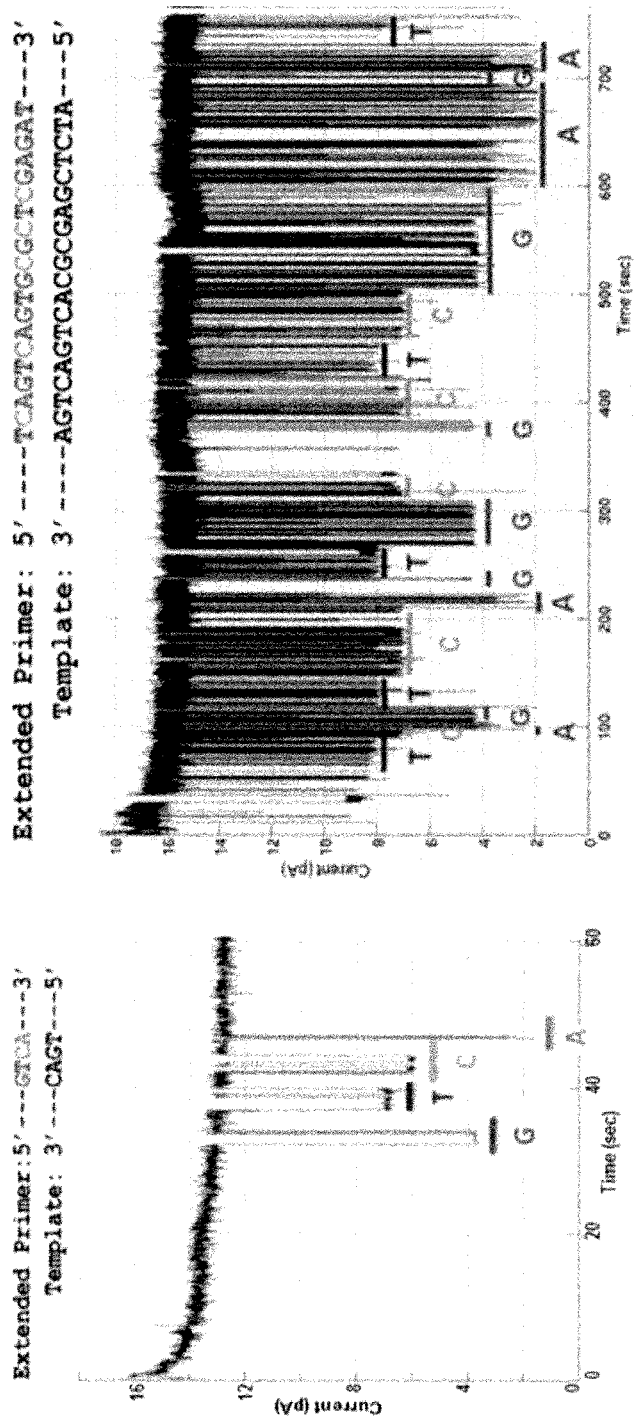
FIG. 2: Sequencing results on nanopore array chips. Sequencing reactions were performed with inserted αHL pores conjugated to a single Phi29 DNA polymerase molecule, template, and the four tagged nucleotides, with a higher ratio of non-catalytic to catalytic divalent metal cations than in FIG. 3. The left trace shows 4 bases are clearly distinguished; the right figure shows a longer sequence read (Fuller et al. 2016).
Figure 3:
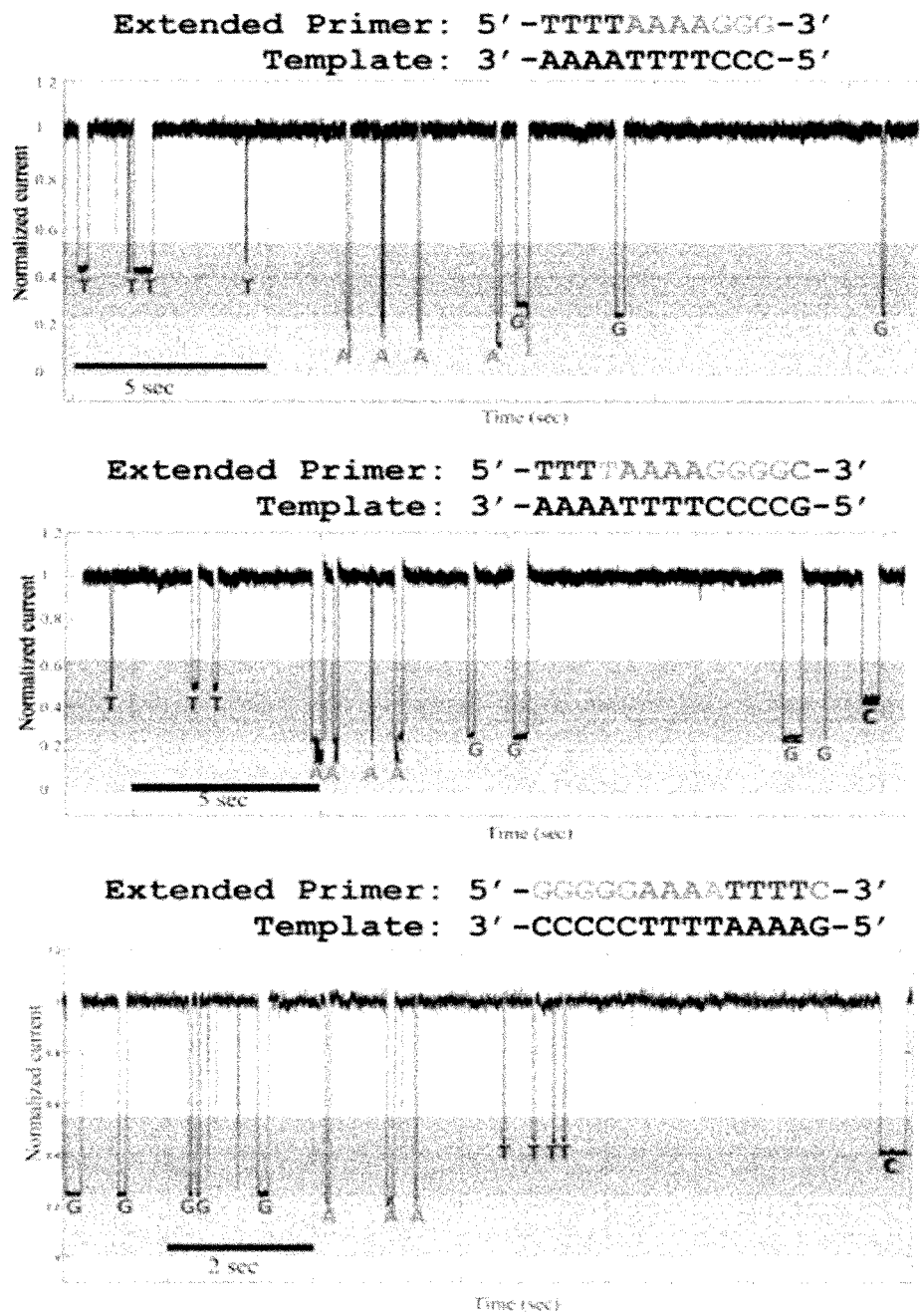
FIG. 3: Examples of nanopore-SBS sequence reads, as described in Fuller et al. 2016, but with a higher ratio of catalytic to non-catalytic divalent metal cations than in FIG. 2. The data indicate that homopolymer sequences can be imperfectly determined by nanopore-SBS. Letters shown in gray in the template strand indicate bases that were missed in these reads. Note the missing T in the middle trace and the missing A in the bottom trace (Fuller et al. 2016).

In current Nanopore-SBS results, two kinds of errors are typically encountered, "overcalls" and "undercalls". Overcalls occur when polymerase binds a specific nucleotide and the binding is recognized but the bound nucleotide is actually not incorporated into the primer stand, resulting in an "extra" nucleotide reported in the sequence. Undercalls are the events wherein the nucleotide is bound and incorporated without being detected in the pore, resulting in a nucleotide missing from the sequence read. Although both kinds of incorrect reporting occur, overcalls predominate under conditions favorable for detecting all the events (where polymerization is relatively slow), resulting in ambiguous multiple current signals. A comparison of FIGS. 2 and 3 reveals the situation more clearly. In FIG. 2, an excess of non-catalytic over catalytic metal ions present during the polymerase reaction results in inconsistent stutter signals, where the length of the stutter for each base is seemingly random. Because every base was different from the adjacent bases in the tested templates, it was possible to read this sequence by noting where the blockade current signals changed levels. However, if this was a homopolymer stretch, it would be difficult to know how many bases were incorporated. One can obtain better results with homopolymer stretches by having predominantly catalytic metal ions present (FIG. 3), but then incorporation events are often missed, resulting in undercalls (e.g., only 3 A's incorporated although 4 T's were present in the template in the bottom sequence in FIG. 3). In the three approaches described below, ways to overcome this "indel issue" are described, which take better advantage of the stutter signals. The stutters will be present for a sufficiently long period of time to convincingly call the ionic current blockade signal thereby defining the incoming nucleotide. Either a fifth signal (Approach 1) or a reversible termination event (Approaches 2 and 3) will be used to indicate movement of the polymerase from one nucleotide in the template to the next.

In Approach 1, the stutter will be produced by the binding of one of the four differently tagged unincorporable nucleotides and the shift to the next position will be indicated by the signal due to incorporation of a natural nucleotide (dNTP) bearing a fifth tag. In Approach 2, the stutter will be produced again by the binding of one of four tagged unincorporable nucleotides, and movement to the next nucleotide will be indicated by incorporation of an untagged nucleotide reversible terminator (NRT) followed by cleavage of its blocking group. In Approach 3, the stutter will be produced by tagged NRTs in the presence of an appropriate ratio of non-catalytic to catalytic divalent metal ions, and movement to the next position will follow cleavage of the blocking group on the NRT. In the latter 2 approaches, a fifth ionic current level is not necessary, since only one nucleotide can be incorporated at a time thanks to the use of NRTs. In contrast, the first approach occurs in "real" time.

Approach 1: Use of 4 Uniquely Tagged Unincorporable Nucleotides ("Stop Tags") and 4 Commonly Tagged dNTPs ("go Tags") for Real-Time Nanopore-Based SBS.

Previous publications described the adjustment of ratios of catalytic and non-catalytic metal ions to control the speed of the polymerase reaction as an aid to accomplishing real-time single molecule electronic nanopore sequencing by synthesis (Nanopore SBS). While this certainly helped to obtain long and fairly accurate reads, the inventors named on this application noted that appearance of insertion and deletion artifacts ("indels") in sequence reads occurred at higher than acceptable level for many sequencing purposes. Presumably it is difficult to strictly regulate the on/off and replacement rates of these small ions in the ternary complex.

Thus, the inventors of this application realized that another way to control polymerization rates would be to take advantage of unincorporable nucleotides (UINs). These UINs, when present in excess will be more likely to enter the ternary complex than the less abundant dNTPs, but because they cannot be incorporated, will inhibit extension of the primer strand. It is disclosed herein that UINs and dNTPs have similar binding constants, so that by simply adjusting the ratio of the UINs and dNTPs, the polymerase reaction speed can be controlled. Here this principle is used to design a nanopore sequencing method, by utilizing versions of these UINs and dNTPs bearing nanopore tags.

Four different tags are present on the UINs ("stop tags"), each associated with a different base. In contrast a single (5th) tag is present on all 4 of the dNTPs. As will be described below, this will result in a highly accurate sequencing method, which will overcome the "indel" problem by increasing the number of signal calls ("stutter" of one of the 4 tags) due to UIN binding at each template position, and demarcating the different positions thanks to the 5th tag on the incorporated dNTP.

Nucleotides were synthesized with tags consisting of a polynucleotide backbone with chemical modifications of different sizes or other chemical properties (e.g., charge) at a position expected to span the most constricted portion within the hemolysin channel and thus producing different current blockade levels. These tagged nucleotides were shown to be active DNA polymerase substrates. A highly processive DNA polymerase was conjugated to the nanopore, the conjugate was complexed with primer and template DNA, and inserted into lipid bilayers over individually addressable electrodes of the nanopore chip. When a tagged nucleotide forms a tight ternary complex with primer/template and polymerase, the tag is held within the pore long enough to measure the current blockade level in real time before the nucleotide is incorporated and the tag is released.

Ternary complexes with differently tagged nucleotides produced clearly distinguishable sequence-specific blockade signals enabling continuous sequence determination with single base resolution during the polymerase reaction. Even so, since single molecule extension reactions are stochastic (Fuller et al. 2016), with the appearance of long and short stutters at each position, it is difficult in some cases to know whether one or multiple bases have been incorporated.

Figure 4:
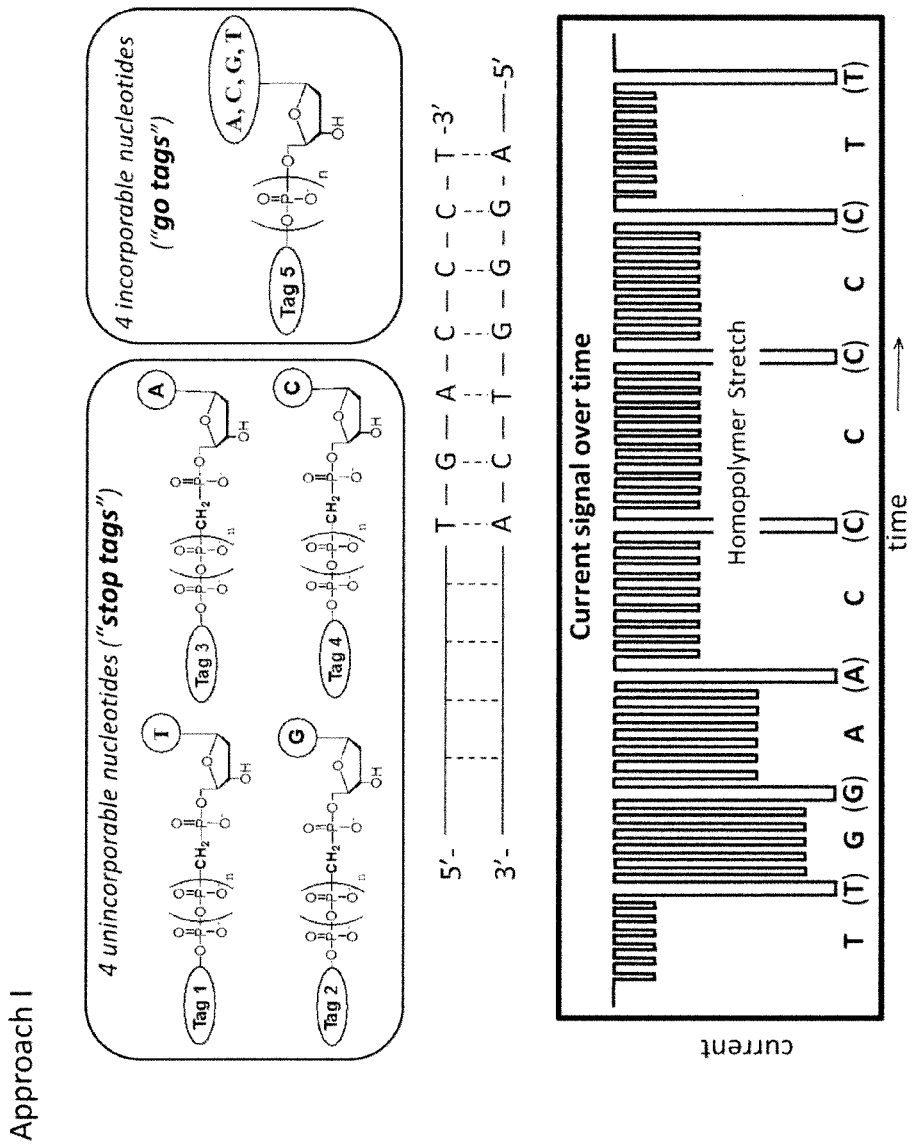
FIG. 4: Principle of the single-molecule electronic Nanopore-SBS approach with the use of unincorporable tagged nucleotides ("stop"-tag nucleotides) and incorporable tagged nucleotides ("go"-tag nucleotides). The general structures of these nucleotide analogues are shown at the top (left and right, respectively). These are added to the primer/template/polymerase complex which is attached to a nanopore embedded in membranes in a nanopore array chip. As each of the complementary "stop"-tag nucleotides forms a ternary complex with the polymerase and a primed template, a series of signals (bottom) related to each of the 4 tags are obtained (so-called stutter signals) for sequence determination. Eventually, the primer is extended with the equivalent "go"-tag nucleotide, shown producing a lower current signal due to the 5th tag. The intermittent signals produced by the combination of "stop"- and "go"-tag nucleotides yields highly accurate sequence, largely eliminating false overcalls and undercalls. This approach allows detection of a single nucleotide binding event multiple times (stutters) before the actual incorporation event, overcoming the inherent limitation of single molecule detection methods that only allow one chance for measurement.

If one could have a recognizable non-specific signature demarcating the shift from any base to the next base, this problem would be eliminated. An approach solving this problem is disclosed herein, and shown in FIG. 4. This approach uses a combination of unincorporable nucleotides, each with a unique tag (FIG. 4, top left), and incorporable tagged nucleotides with a fifth tag (FIG. 4, top right) to accomplish this goal. The first signal (tags 1-4) will identify the specific base at the next available position in the template, and the second signal (tag 5) will indicate that one is moving to the subsequent available template position. By better controlling the timing of the polymerase reaction to maximize the likelihood of capturing and detecting the unique signals for each base, this should increase the sequencing accuracy substantially, especially for runs of the same bases (homopolymer stretches). This approach allows detection of a single nucleotide binding event multiple times (stutters) before the actual incorporation event, overcoming the inherent limitation of single molecule detection methods that only allow one chance for measurement.

Other improvements to the established sequencing engine will include the use of long barrel pore constructs, in combination with neutral or positively charged tags, to increase the range and resolution of signals (blockade currents), enable well separated fifth tag readings, and increase the capture rates, resulting in further increases in accuracy.

The rationale of this approach disclosed herein is to take advantage of the "overcall" character of the slow polymerization SBS mode, identifying each nucleotide with high confidence by observing a cluster of rapid "overcall" signals due to the tags on unincorporable nucleotides, instead of a single signal from the incorporated nucleotide. Thus, a single nucleotide incorporation event will be identified by detecting a set of several stutter signals followed by a 5th distinct signal. Coordinating this with the addition of incorporable tag-nucleotides with their characteristic current blockade signals will result in the unambiguous identification of each base. To guarantee obtaining stutter signals, the nucleotide analogues have to bind correctly but not react with the primer terminus. The approach is described in FIG. 4. The unincorporable (or unreactive) tagged nucleotides will result in numerous nucleotide binding events, and the primer will be extended by the incorporable tag-nucleotide which is in much lower concentration than the unincorporable nucleotide. After incorporation of the correct nucleotide, the sequencing is ready for the next cycle resulting in stutter signals characteristic of the next complementary base on the primer. The ideal ratio of unincorporable to incorporable nucleotides is determined by titration.

More specifically, in this approach, a high concentration of the 4 (A, C, G and T) unincorporable tagged nucleotide analogues ("stop-tag nucleotides"), each having a distinct signal-producing polymer tag (tags 1-4) attached, and a low concentration of the 4 incorporable tagged nucleotides ("go-tag nucleotides"), all with the same 5th tag with a current blockade level different from that of the other 4 tags, are used. Polymerase specifically captures "stop-tag" nucleotides complementary to the next available nucleotide in the template strand but the reaction cannot proceed, so the "stop-tag" nucleotide is released without extension. Repeat captures (stutter) will occur since this nucleotide is not incorporated into the DNA primer strand and is at high concentration, yielding the threaded "stop" level from the corresponding 4 tags on the 4 non-incorporable nucleotides. Eventually, polymerase captures a "go-tag nucleotide" (of lower concentration), and an incorporation reaction takes place advancing the sequence, as indicated by the 5th tag signal. This approach should provide a high-fidelity mode for single molecule DNA sequencing. The best known "stop-tag" nucleotides include α,β-methylene (Liang et al. 2008) and Rp isomer of α-thio-nucleotides (Gharizadeh et al. 2002 that only form a ternary complex with the polymerase but are not incorporated (FIG. 5). To test the approach, disclosed herein are the Rp-isomer of deoxyguanosine hexaphosphate and attached a long chain oligomer tag to the terminal phosphate, which were synthesized and characterized. This tag-nucleotide is not a substrate for DNA polymerase while the other isomer (Sp) is a good substrate (cf. Table 1).

Synthesis of Unincorporable Tagged Deoxynucleoside-5'-Hexaphosphates Based on α-Thio-Nucleotides (Rp Isomer)

Figure 6:
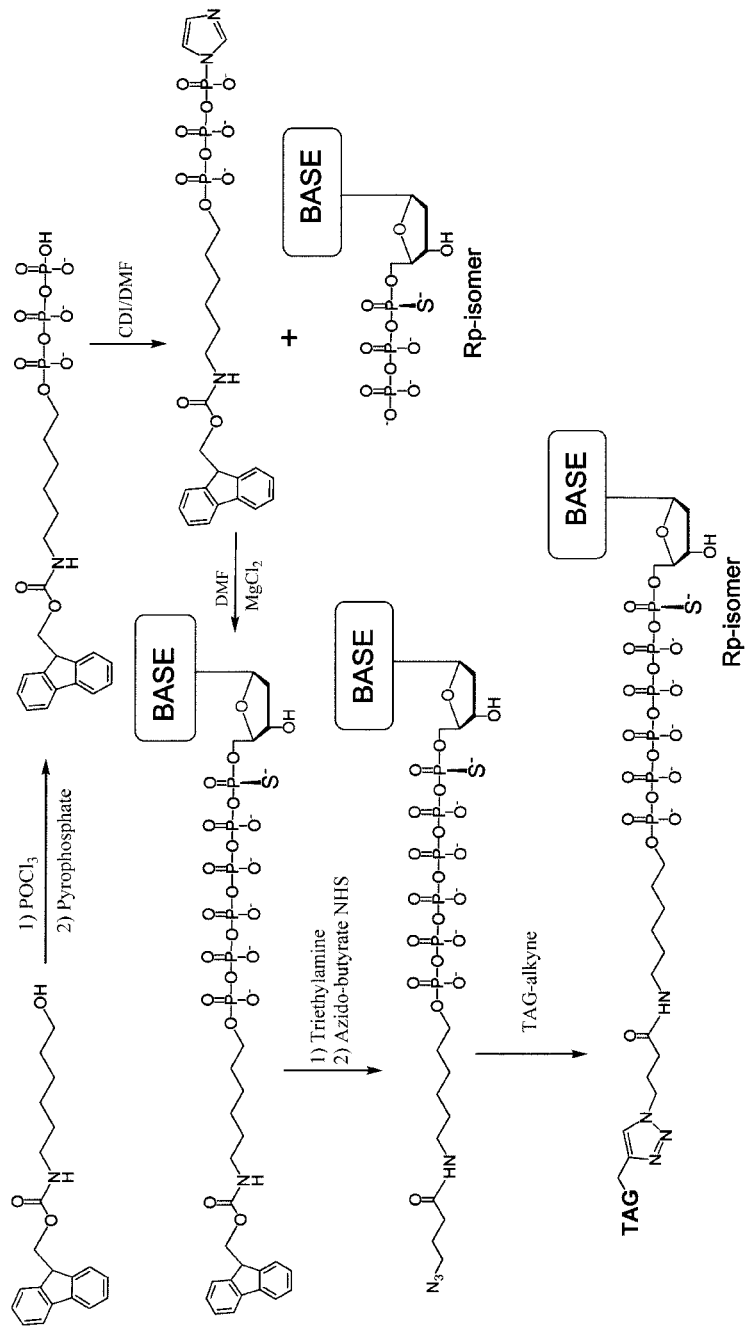
FIG. 6: Scheme for synthesis of Rp isomers of α-thio-nucleoside-5'-hexaphosphates ("stop-tag" nucleotides).

The synthetic strategy for producing non-incorporable tagged nucleotides (FIG. 6) is essentially the same as reported earlier (Fuller et al. 2016). In the first step, synthesis of α-thio-nucleoside-5'-triphosphate (Rp isomer) is carried out by reacting 2'-deoxynucleoside with PSCl3 followed by pyrophosphate. This results in the formation of diastereoisomers (Rp & Sp-isomers) of α-thio-nucleoside-5'-triphosphate which can be separated to homogeneity by ion-exchange chromatography followed by RP-HPLC. The reaction of 6-(Fmoc-amino)-1-hexanol with POCl3 and pyrophosphate yields 6-Fmoc-amino-hexanol triphosphate which on activation with CDI/DMF followed by reaction with α-thio dNTPs (Rp-isomer) yields amino terminated hexaphosphates. These are converted to azido nucleotides (azido-dN6Ps) by reaction with azidobutyrate NHS ester and then reacted with oligonucleotide-based polymer tags synthesized with a 5'-alkyne moiety that readily reacts with the desired azido-dN6P by azide-alkyne Huisgen cycloaddition 18 to produce the tagged nucleotides. Incorporable tagged deoxynucleoside-5'-hexaphosphates are synthesized as described previously (Fuller et al. 2016).

Disclosed herein are observations that the charge density in the nanopore channel plays a critical role in determining current blockade levels. For example, the placement of the same number of ethylene glycols compared to propylene or longer chain glycols in the polynucleotide backbone of the tag leads to a decreased charge spacing and higher overall charge in the nanopore channel, resulting in higher ionic current blockade levels. Similarly, increasing the overall number of positive charges in the backbone yields lower ionic currents. Neutral backbone derivatives such as methylphosphonates show current levels above the positively charged tags. These observations can be further explored to achieve better signal separation which can allow further improved resolution of the 5 tags.

Determining Dissociation Constants for Unincorporable Nucleotides

Disclosed herein is a determination of a number of enzymatic parameters including substrate binding and dissociation constants (examples in Table 1) under a variety of conditions and with a variety of nucleotide analogs (NTPs, N6Ps, tagged N6Ps, α-thio and α,β-methylene nucleotide polyphosphates). In addition to these compounds, disclosed herein are fluorescent nucleotide analogs and unincorporable (α-thio) nucleotides that were designed and synthesized for the polymerase tests to develop new Nanopore-SBS approaches as described below. As expected, dCp-CH2-pp and the Rp isomers (but not the Sp isomers) of α-thio-nucleoside-5'-dNTPs do not bind as tightly to the polymerase in the ternary complex.

TABLE 1

Dissociation constants for natural and unincorporable nucleotides with Phi29-type DNA polymerase as determined by fluorescence assays.

| nucleotide | $K_D$ (nM) |
| --- | --- |
| dGTP | 6 |
| dCTP | ~5 |
| dCp-CH$_2$-pp | 25,000 |
| 2'-dGTP-αS (Sp-isomer) | 6 |
| 2'-dCTP-αS (Sp-isomer) | 1 |
| 2'-dGTP-αS (Rp-isomer) | 910 |
| 2'-dCTP-αS (Rp-isomer) | 750 |
| αS-dG6P-N$_3$ (Rp-isomer) | 670 |

The "stop" and "go" single molecule electronic Nanopore-SBS approach using unincorporable and incorporable tagged nucleotide analogues are tested using the sequencing engine described in prior publications, consisting of a single Phi29 DNA polymerase conjugated to one of the subunits of the α-hemolysin heptamer, circular or primer loop templates (Fuller et al. 2016; Stranges et al. 2016, and the latest version of the Genia nanopore chip platform and software). Confirmation that the hemolysin-Phi29 polymerase complex has appropriate properties (stoichiometry, enzyme turnover rates, template/primer binding, ability to enter membranes, etc.) must be first demonstrated, using standard tagged nucleotides. For some experiments, related highly processive enzymes that work well in this system are used.

Characterizing the "Stop-Tag" Nucleotides Using Synthetic Templates: The oligonucleotides and nucleotides shown in Table 2 are designed to demonstrate the ability of each of the pairs of "stop-and-go"-tagged nucleotides (A, C, G and T) to function as polymerase substrates for single base extension reactions. With a synthetic template having an A at the next available position, and a different base at the subsequent position, the test is run with just thymidine (T) unincorporable nucleotides with tag 1 and T incorporable nucleotides with tag 5 (see Table 2, row 1). The same test for G, C and A utilizes the templates in rows 2-4 of Table 2, respectively. Templates should be approximately 50 bases long and include a primer binding site (in the case of a circular template) or designed as primer-loop templates in which the 3' end of the oligonucleotide loops back to self-prime, as shown in Table 2. The extension reaction is initially tested by agarose gel electrophoresis. Subsequently, on-chip assays are carried out to determine if the appropriate combination of stutter signals (due to the tags 1-4 on the "stop-tag" nucleotides) followed by a brief signal due to the common tag 5 present in the "go-tag" nucleotides, is obtained.

TABLE 2

Sets of templates, unincorporable ("stop") tagged nucleotides and incorporable ("go") tagged nucleotides for testing the new approach.

| Template | "Step"-Tag Nuc | "Go"-Tag Nuc |
|---|---|---|
| 5' . . . ACGATCAGGGACTCAAGCTACGGATATCCAGTTCAC<sup>AGGTCACAGC</sup><sub>C</sub> | $_{stop}$T-Tag1 | T-Tag5 |
| 5' . . . ACGATCAGGGACTCAAGCTACGGATCTCCAGTTCAC<sup>AGGTCACAGC</sup><sub>C</sub> | $_{stop}$G-Tag2 | G-Tag5 |
| 5' . . . ACGATCAGGGACTCAAGCTACGGAAGTCCAGTTCAC<sup>AGGTCACAGC</sup><sub>C</sub> | $_{stop}$C-Tag3 | C-Tag5 |
| 5' . . . ACGATCAGGGACTCAAGCTACGGAATTCCAGTTCAC<sup>AGGTCACAGC</sup><sub>C</sub> | $_{stop}$A-Tag4 | A-Tag5 |
| 5' . . . ACGATCGTATCAGATAGCTACTATATTCCAGTTCAC<sup>AGGTCACAGC</sup><sub>C</sub> | $_{stop}$T-Tag1<br>$_{stop}$G-Tag2<br>$_{stop}$C-Tag3<br>$_{stop}$A-Tag4 | T-Tag5<br>G-Tag5<br>C-Tag5<br>A-Tag5 |
| 5' . . . ACGATCAGGGACTCCAGCTACGGTATTCCAGTTCAC<sup>AGGTCACAGC</sup><sub>C</sub> | | |
| 5' . . . ACGATCCAAATCTTTAGCTACAATATTCCAGTTCAC<sup>AGGTCACAGC</sup><sub>C</sub> | | |

After demonstrating that each of these pairs of nucleotides result in the expected combination of signals (stutter due to the tag on the unincorporable base followed by a brief signal due to the tag on the incorporated nucleotide), a series of synthetic templates for sequencing reactions (rows 5-7 of Table 2) are utilized for addition of the full set of 8 nucleotides (4 unincorporable nucleotides with 4 different tags and 4 incorporable nucleotides each bearing the same 5th tag) using run-off sequencing with loop templates or multi-pass sequencing with circular templates. A variety of template DNA molecules have been synthesized for this purpose. The circular templates have been circularized using CircLigase (Epicentre) or by generation of adapter-containing SMRT libraries (using NEB kits). Templates in which every base is different from the adjacent base, templates including multiple short runs of A or T, and templates including multiple short runs of C or G, as shown in rows 5-7 of Table 2, are of particular value for these tests. The templates with homopolymer runs serve as the true test of our method. The sequences are determined using the base-calling software designed for the Genia (Roche) sequencing platform and error rates as well as specific errors assessed by comparison with the known sequence. This test is used to ascertain whether there is a reduction in overcalls relative to the method with only incorporable nucleotides.

Based on the dissociation constants we measured for these nucleotides in Table 1, ratios of the concentration of the tagged unincorporable and tagged incorporable nucleotides range between 50:1 to 500:1, but this range can be expanded and adjusted for differences among the four nucleotides as needed to achieve a 10- to 100-fold decrease in the error rate.

Approach 2: Use of 4 Uniquely Tagged Unincorporable Nucleotides, in Combination with NRTs, for "Stop and Go" Nanopore-Based SBS.

Figure 7:
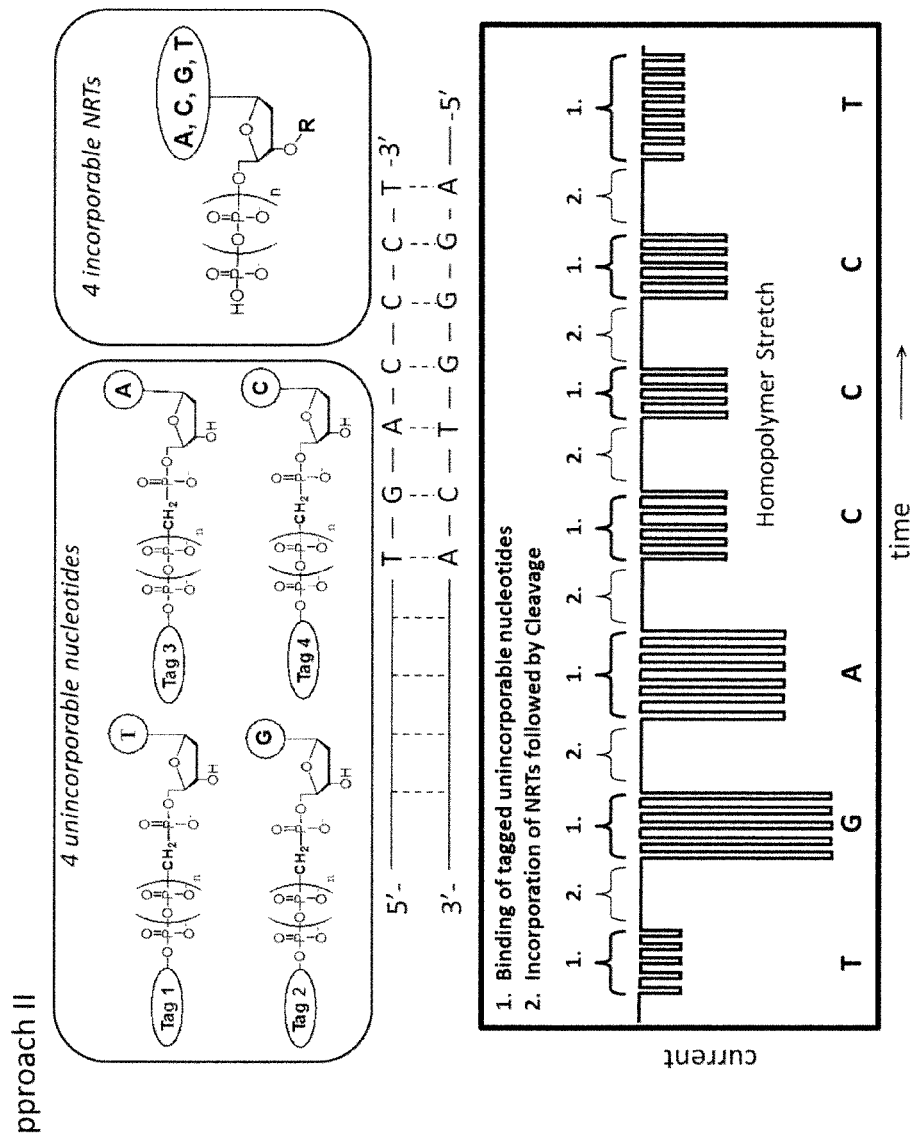
FIG. 7: Principle of the single-molecule electronic Nanopore-SBS approach with the use of unincorporable tagged nucleotides and incorporable untagged nucleotide reversible terminators. The general structures of these nucleotide analogues are shown at the top (left and right, respectively). These are added to the primer/template/polymerase complex which is attached to a nanopore embedded in membranes in a nanopore array chip. As each of the complementary "stop"-tag nucleotides forms a ternary complex with the polymerase and a primed template, a series of signals (bottom) related to each of the 4 tags are obtained (so-called stutter signals) for sequence determination. Eventually, the primer is extended with the equivalent nucleotide reversible terminator, which does not produce a signal. Following cleavage of the blocking group on this NRT, the complex is ready for the next "stop"-tag nucleotide addition. The resulting signals yield highly accurate sequence, largely eliminating false overcalls and undercalls. This approach allows detection of a single nucleotide binding event multiple times (stutters) before the actual incorporation event, overcoming the inherent limitation of single molecule detection methods that only allow one chance for measurement.

The second approach described herein is a hybrid approach that utilizes both NRTs and tagged UINs to accomplish nanopore SBS, and is illustrated in FIG. 7. In this case, the NRTs do not have to be tagged. The four UINs each have a unique tag, specific to the base. In this "stop and go" single molecule electronic nanopore-based SBS approach, there are two steps. In the first step, the four tagged UINs along with the four NRTs, present at a much lower relative concentration, are added to the ternary complex of polymerase, template and primer. Tagged UINs (A, C, G and T) complementary to the next base in the template strand will bind to the complex and their tags will be captured in the channel of the nanopore when an appropriate voltage is applied across the membrane. Eventually, a complementary NRT will bind to the same nucleotide in the template and be incorporated, extending the primer by one base and advancing the polymerase to the next position on the template. In this approach, after step 1, depending upon the speed of detection, a series of tag capture events, with a similar stutter pattern to those depicted in FIG. 1, will be observed. Based on the ionic current blockade relative to the open channel current, the tag will be identified and hence the nucleotide at that position will be determined. As an NRT, it prevents incorporation of any additional nucleotides. After washing, the blocking group at the 3'-OH of the NRT is cleaved, resetting the system for the next cycle of SBS. Though this method does not allow as high throughput as the previous method, it should have extremely high accuracy, completely eliminating insertion artifacts, owing to the use of the NRTs to demarcate SBS cycles.

In a variant of this approach, which does not require titering the ratios of the tagged unincorporable nucleotides and the untagged NRTs, the tagged unincorporable nucleotides are added in a first step, and after allowing sufficient time for detection of their tags followed by a wash step, the untagged NRTs are added. A subsequent wash and cleavage step to remove the 3' blocking group resets the system for the next cycle of nanopore SBS. This variant should be especially accurate owing to the extended and constant time provided for binding the tagged UINs and to the use of the NRTs to demarcate SBS cycles. If desired, a common 5th tag, distinct from the four tags on the unincorporable nucleotides, can be placed on all four NRTs.

Approach 3: Use of Tagged NRTs for "Stop and Go" Nanopore SBS.

Figure 8:
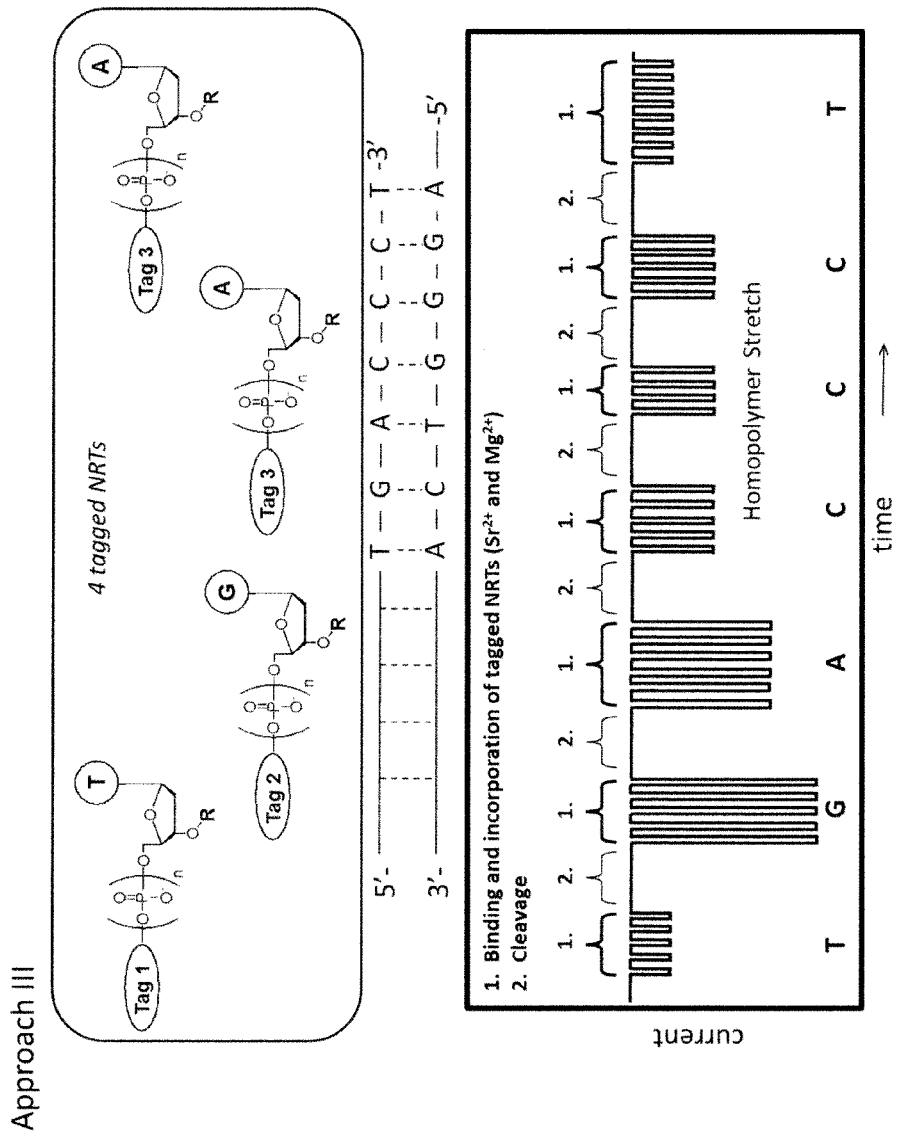
FIG. 8: Principle of the single-molecule electronic Nanopore-SBS approach with the use of tagged nucleotide reversible terminators. The general structures of these nucleotide analogues are shown at the top. These are added to the primer/template/polymerase complex which is attached to a nanopore embedded in membranes in a nanopore array chip, in the presence of an appropriate ratio of non-catalytic and catalytic divalent metal ions. As each of the complementary tagged nucleotide reversible terminators forms a ternary complex with the polymerase and a primed template, a series of signals (bottom) related to each of the 4 tags are obtained (so-called stutter signals) for sequence determination. Eventually, the primer is extended with one of these nucleotide reversible terminators. Following cleavage of the blocking group and tag on this NRT, the complex is ready for the next tagged nucleotide reversible terminator addition. The resulting signals yield highly accurate sequence, largely eliminating false overcalls and undercalls. This approach allows detection of a single nucleotide binding event multiple times (stutters) before the actual incorporation event, overcoming the inherent limitation of single molecule detection methods that only allow one chance for measurement.

In this final approach, illustrated in FIG. 8, four tagged nucleotide reversible terminators, A, C, G and T, each with a specific tag that produces a unique ionic current blockade signature in Nanopore SBS, are used. The principle is straightforward. The tagged NRT complementary to the next available position in the DNA template strand binds and is incorporated for DNA polymerase into the growing DNA primer strand. The polymerase reaction rate may be reduced by the presence of a high ratio of non-catalytic to catalytic metal ions. After the tag-dependent signal is recorded and the tag is removed (naturally or chemically), the blocking group at the 3'-OH is removed to prime the sequence for the next reaction cycle.

In this approach, one can consider three positions for placement of the nanopore tags on the NRT: the sugar (e.g., 2' or 3' OH position), the base (e.g., 5 position of pyrimidines or 7 position of purines), and the terminal phosphate. A prior publication (Ju et al. 2017) refers to the placement of the tag, attached via an intermediate anchor, to the 3' 0 position on the sugar. Herein disclosed are two other placements.

If the tag is attached to the terminal phosphate of a nucleoside triphosphate, tetraphosphate, or higher polyphosphate, one must contend with the fact that it will be removed as soon as the polymerase reaction has taken place. Thus, one will have only moments to identify the tag from the time the nucleotide is bound to the ternary complex until it is cleaved and passes through the nanopore. A method we described earlier (Davis, Chen, Bibillo, Korenblum 2013; Fuller et al. 2016; Stranges et al. 2016) can be taken advantage of, in which a mixture of catalytic and non-catalytic metal ions, the latter in substantial excess, are included during the polymerase reaction. The majority of recorded events will take place while the non-catalytic metal ion (e.g., Sr++, Ca++) is bound to the ternary complex and incorporation cannot take place. Eventually, however, a catalytic ion (e.g., Mg++, Mn++) will replace the non-catalytic ion, and the polymerase reaction will occur essentially instantaneously. This will in effect advance the position of the polymerase to the next nucleotide in the template strand, and after cleavage of the 3'-OH blocking group on the NRT, the system is reset for the next incoming complementary NRT. With the typical very rapid duty cycles used for recording signals (e.g., ~1 MHz), an ionic current blockade stutter signal for the specific tag will be seen up until the incorporation event in each sequencing cycle. After a few seconds, washing and cleavage will be performed; in this single molecule approach, cleavage reactions should occur very rapidly, so that even though this is not real-time sequencing, it should still be possible to get quite long reads in reasonable amounts of time, probably substantially shorter times than other SBS methods. With high enough copy number nanopore arrays (hundreds of thousands to millions of nanopores), diagnostic and exome sequencing will be feasible, and whole genome sequencing may be possible. What is lost in throughput, relative to prior nanopore approaches, should be more than made up for in accuracy, thanks to the use of NRTs.

In theory, the tag may also be attached to the bases of the NRTs (5 position of pyrimidines, 7 position of purines), or if the tags themselves are capable of inhibiting the next incorporation event, to the bases of dNTPs (virtual terminators). In these alternate cases, the tags must be attached via a cleavable or photocleavable linker, presumably one that can be cleaved by the same chemical agent or wavelength of visible light as the blocking group at the 3'-OH position. Although there are many choices for cleavable groups in these linkers, likely possibilities include dithiomethyl groups which can be reduced by TCEP or THP, azidomethyl groups which can also be cleaved by TCEP or THP, azo groups which can be cleaved by sodium dithionite, allyl groups which can be reduced by Pd(0), or 2-nitrobenzyl groups which can be cleaved by ~350 nm light. Each of these methods leaves a remnant of the linker in the incorporated nucleotide. These scars would be a particular problem as they build up over multiple sequencing cycles, especially in single molecule methods such as described in this patent, where the remnant would be present at every position. By altering the structure of the resulting DNA, it will eventually be more difficult for it to be recognized by the polymerase for incorporation of additional incoming nucleotides. (In fluorescent ensemble SBS approaches, one can utilize untagged NRTs as capping molecules, meaning that in a collection of growing strands, only a few of the incorporated bases in each strand will have the scar.) Unless linkers can be designed that are completely removed after cleavage, the use of nanopore tags on the bases should only be used if one is interested in very short sequence reads, such as in non-invasive DNA testing for fetal chromosomal aneuploidies.

REFERENCES

Davis R, Chen R, Bibillo A, Korenblum D (2013) Nucleic acid sequencing using tags. U.S. Pat. No. 9,605,309 B2.

Fuller C, Kumar S, Ju J, Davis R, Chen R (2015) Chemical methods for producing tagged nucleotides. WO 2015/148402 A1.

Fuller C W et al. (2016) Real-time single-molecule electronic DNA sequencing by synthesis using polymer-tagged nucleotides on a nanopore array. Proc Natl Acad Sci USA 113(19):5233-8.

Gharizadeh B et al. (2001) Long-read pyrosequencing using pure 2'-deoxyadenosine-5'-O'-(1-thiotriphosphate) Sp-isomer. Anal Biochem 301:82-90.

Ju J (2014) DNA sequencing by nanopore using modified nucleotides. U.S. Pat. No. 8,889,348 B2.

Ju J, Cao H, Li Z, Meng Q, Guo J, Zhang S (2014) Design and synthesis of cleavable fluorescent nucleotides as reversible terminators for DNA sequencing by synthesis. US 2014/0093869 A1.

Ju J, Chen X, Li X, Li Z, Hsieh, M-K, Chien M, Shi S, Ren J, Guo C, Kumar S, Russo J J, Tao C, Jockusch S, Kalachikov S (2017) Nucleotide derivatives and methods of use thereof. WO 2017/205336 A1 and US 2017/033939.

Ju J, Davis R, Chen R (2015) Nucleic acid sequencing by nanopore detection of tag molecules. US 2015/0119259 A1.

Ju J, Kim D H, Bi L, Meng Q, Li X (2011) Four-color DNA sequencing by synthesis using cleavable fluorescent nucleotide reversible terminators. U.S. Pat. No. 7,883,869 B2.

Ju J, Li Z, Edwards J R, Itagaki Y (2012) Massive parallel method for decoding DNA and RNA. U.S. Pat. No. 8,088,575 B2.

Kumar S et al. (2004) Terminal-phosphate-labeled nucleotides with new linkers. U.S. Pat. No. 7,393,640.

Kumar S et al. (2005) Terminal phosphate labeled nucleotides: synthesis, applications, and linker effect on incorporation by DNA polymerases. Nucleosides Nucleotides Nucleic Acids 24:401-8.

Kumar S et al. (2012) PEG-labeled nucleotides and nanopore detection for single molecule DNA sequencing by synthesis. Scientific Reports 2: 684.

Liang et al. (2008) Alpha,beta-methylene-2'-deoxynucleoside 5'-triphosphates as noncleavable substrates for DNA polymerases: isolation, characterization, and stability studies of novel 2'-deoxycyclonucleosides, 3,5'-cyclo-dG, and 2,5'-cyclo-dT. J Med Chem 51:6460-70.

Nelson J, Fuller C, Sood A, Kumar S (2006) Terminal-phosphate-labeled nucleotides and methods of use. U.S. Pat. No. 7,052,839.

Reiner J E et al. (2010) Theory for polymer analysis using nanopore-based single-molecule mass spectrometry. Proc Natl Acad Sci USA 107:12080-5.

Robertson J W et al. (2007) Single-molecule mass spectrometry in solution using a solitary nanopore. Proc Natl Acad Sci USA 104:8207-11.

Siddiqi S (2011) Nucleotide analogs. U.S. Pat. No. 7,956,171 B2.

Stranges P B et al. (2016) Design and characterization of a nanopore-coupled polymerase for single-molecule DNA sequencing by synthesis on an electrode array. Proc Natl Acad Sci USA 113:E6749-6.

What is claimed is:

1. A method for sequencing a nucleic acid, wherein the method comprises:
(a) providing a chip comprising a plurality of individually addressable nanopores, wherein the individually addressable nanopore of said plurality of individually addressable nanopores comprises a nanopore in a membrane that is disposed adjacent to an electrode, wherein said nanopore is linked to a nucleic acid polymerase, and wherein each individually addressable nanopore is adapted to select a tag attached to a tagged nucleotide;
(b) directing said nucleic acid adjacent to or in proximity to said nanopore along with a nucleic acid primer complementary to a portion of said nucleic acid;
(c) providing four types of unincorporable tagged nucleotides (A, C, G, T) and four types of incorporable tagged nucleotides (A, C, G, T) into a reaction chamber comprising each individual said nanopore,
wherein each type of the unincorporable tagged nucleotides comprises a different tag, such that each tag, when captured in said nanopore, elicits a distinct ionic current blockade signal, and wherein each incorporable tagged nucleotide comprises a single fifth tag, which is distinct from the four tags on the unincorporable tagged nucleotides, and which produces a fifth unique ionic current blockade signal;
(d) carrying out a polymerization reaction with the aid of the nucleic acid polymerase;
(e) detecting the tag on any unincorporable tagged nucleotide that binds to the nucleic acid with the aid of said electrode, which event will occur multiple times consecutively, when such unincorporable tagged nucleotides bind and when such tag is captured within the channel of said nanopore;
(f) detecting the tag on any incorporable tagged nucleotide that binds to the nucleic acid with the aid of said electrode, which event will occur one time, wherein the tag is detected prior to its being released from said incorporable tagged nucleotide as the incorporable tagged nucleotide is polymerized along said nucleic acid to generate a strand that is complementary to at least a portion of said nucleic acid, when such tag is captured within the channel of said nanopore;
(g) repeating (e) and (f) as long as the polymerization along the said nucleic acid continues,
thereby obtaining the sequence of said nucleic acid.

2. The method of claim 1, wherein said detecting of (e) further comprises identifying said tag, or correlating said identified tag with a type of said unincorporable tagged nucleotide (A, C, G or T); or
wherein said detecting of (f) further comprises identifying said tag, or correlating said identified tag with an incorporable as opposed to unincorporable nucleotide, though not correlating said identified tag specifically with A, C, G or T.

3. The method of claim 1, wherein-when a voltage gradient is applied across the membrane into which the nanopore is inserted, each tag of the four unincorporable tagged nucleotides and the fifth tag of each incorporable tagged nucleotides alter the ionic current passing through the nanopore channel by a different and distinguishable extent compared with the open channel ionic current.

4. The method of claim 1, wherein the unincorporable tagged nucleotides directed to the nucleic acid are present in excess relative to the incorporable tagged nucleotides directed to the nucleic acid, such that several measurements (stutter) occur for tags on unincorporated tagged nucleotides prior to a single continuous measurement occurring for tags on incorporated tagged nucleotides.

5. The method of claim 4, wherein the unincorporable tagged nucleotides are present at more than 5×, 50×, or 500× the abundance of the incorporable tagged nucleotides.

6. The method of claim 1, wherein the unincorporable tagged nucleotide comprises an α,β-methylene triphosphate, tetraphosphate, pentaphosphate or higher polyphosphate; or an α,β-imido triphosphate, tetraphosphate, pentaphosphate or higher polyphosphate; or an α-thio (Rp) or β-thio triphosphate, tetraphosphate, pentaphosphate or higher polyphosphate.

7. A method for sequencing a nucleic acid, wherein the method comprises:
(a) providing a chip comprising a plurality of individually addressable nanopores, wherein the individually addressable nanopore of said plurality of individually addressable nanopores comprises a nanopore in a membrane that is disposed adjacent to an electrode, wherein said nanopore is linked to a nucleic acid polymerase, and wherein each individually addressable nanopore is adapted to select a tag attached to a unincorporable tagged nucleotide from a set of four possible separately unincorporable tagged nucleotides;
(b) directing said nucleic acid molecule adjacent to or in proximity to said nanopore along with a nucleic acid primer complementary to a portion of said nucleic acid;
(c) providing four types of unincorporable tagged nucleotides (A, C, G, T) and four types of untagged nucleotide reversible terminators (A, C, G, T) into a reaction chamber comprising each individual said nanopore;
wherein each type of the unincorporable tagged nucleotides comprises a different tag, such that each tag, when captured in said nanopore, elicits a distinct ionic current blockade signal;
(d) carrying out a polymerization reaction with the aid of the nucleic acid polymerase;
(e) detecting the tag on any unincorporable tagged nucleotide that binds to the nucleic acid with the aid of said electrode, which event will occur multiple times, when such unincorporable tagged nucleotides bind and when such tag is captured within the channel of said nanopore, until an untagged nucleotide reversible terminator is bound and is polymerized to the nucleic acid primer along said nucleic acid to generate a strand that is complementary to at least a portion of said nucleic acid; wherein said nucleotide reversible terminators have a blocking group at the 3' hydroxyl position;

(f) cleaving the 3' blocking group on said polymerized nucleotide reversible terminator in such a way as to regenerate the 3' hydroxyl group on said nucleotide reversible terminator;

(g) repeating (c) to (f) as long as the polymerization along the said nucleic acid continues, thereby obtaining the sequence of said nucleic acid.

8. The method of claim 7, wherein said detecting of (e) further comprises identifying said tag, or correlating said identified tag with a type of said unincorporable tagged nucleotide (A, C, G or T).

9. The method of claim 7, wherein, when a voltage gradient is applied across the membrane into which the nanopore is inserted, each tag of the four unincorporable tagged nucleotides alter the ionic current passing through the nanopore channel by a different and distinguishable extent compared with the open channel ionic current.

10. The method of claim 7, wherein
   a) the untagged nucleotide reversible terminators have an allyl group at the 3' OH position;
   b) the untagged nucleotide reversible terminators have an azidomethyl group at the 3' OH position;
   c) the untagged nucleotide reversible terminators have a dithiomethyl group or derivative of a dithiomethyl group at the 3' OH position; or
   d) the untagged nucleotide reversible terminators have a 2-nitrobenzyl group at the 3' OH position.

11. The method of claim 7, wherein the unincorporable tagged nucleotide comprises an α,β-methylene triphosphate, tetraphosphate, pentaphosphate or higher polyphosphate; or an α,β-imido triphosphate, tetraphosphate, pentaphosphate or higher polyphosphate; or an α-thio (Rp) or β-thio triphosphate, tetraphosphate, pentaphosphate or higher polyphosphate.

12. The method of claim 2, wherein the unincorporable tagged nucleotides directed to the nucleic acid are present in excess relative to the incorporable tagged nucleotides directed to the nucleic acid, such that several measurements (stutter) occurs for tags on unincorporated tagged nucleotides prior to a single continuous measurement occurring for tags on incorporated tagged nucleotides.

13. The method of claim 12, wherein the unincorporable tagged nucleotides are present at more than 5×, 50×, or 500× the abundance of the incorporable tagged nucleotides.

14. The method of claim 7, wherein the unincorporable tagged nucleotides and the untagged nucleotide reversible terminators are not added to the reaction chamber at the same time but in consecutive steps, so as to avoid having to adjust the ratios between said unincorporable tagged nucleotides and said untagged nucleotide reversible terminators.

15. A method for sequencing a nucleic acid, wherein the method comprises:

(a) providing a chip comprising a plurality of individually addressable nanopores, wherein the individually addressable nanopore of said plurality of individually addressable nanopores comprises a nanopore in a membrane that is disposed adjacent to an electrode, wherein said nanopore is linked to a nucleic acid polymerase, and wherein each individually addressable nanopore is adapted to select a tag attached to a tagged nucleotide reversible terminator from a set of four possible separately tagged nucleotide reversible terminators (A, C, G and T) bearing tags 1, 2, 3 and 4 respectively; wherein said tagged nucleotide reversible terminators have a blocking group at the 3' hydroxyl position, and said tag at the terminal phosphate position;

(b) directing said nucleic acid adjacent to or in proximity to said nanopore along with a nucleic acid primer complementary to a portion of said nucleic acid;

(c) providing four types of tagged nucleotide reversible terminators (A, C, G, T) into a reaction chamber comprising each individual said nanopore; wherein said tagged nucleotide reversible terminators have a blocking group at the 3' hydroxyl position;

(d) carrying out a polymerization reaction with the aid of the nucleic acid polymerase;

(e) detecting on any tagged nucleotide reversible terminators that binds to the nucleic acid with the aid of said electrode, when such tagged nucleotides reversible terminators bind and when said tag is captured within the channel of said nanopore, which event will reveal the specific tagged nucleotide reversible terminator polymerized along said nucleic acid;

(f) cleaving the 3' blocking group on said polymerized tagged nucleotide reversible terminator in such a way as to regenerate the 3' hydroxyl group on said tagged nucleotide reversible terminator;

(g) repeating (c) to (f) as long as the polymerization along the said nucleic acid continues, wherein the tag is attached to the terminal phosphate of each said tagged nucleotide reversible terminators;

thereby obtaining the sequence of said nucleic acid.

16. The method of claim 15, wherein said detecting of (e) further comprises identifying said tag, or correlating said identified tag with a type of said tagged nucleotide reversible terminator (A, C, G or T).

17. The method of claim 15, wherein the tagged nucleotide reversible terminator comprises 3 phosphates, 4 phosphates, 5 phosphate, 6 phosphates, or more than 6 phosphates between the sugar and the tag.

18. The method of claim 15,
   a) wherein the tagged nucleotide reversible terminators have an allyl group at the 3' OH position;
   b) wherein the tagged nucleotide reversible terminators have an azidomethyl group at the 3' OH position;
   c) wherein the tagged nucleotide reversible terminators have a dithiomethyl group or derivative of a dithiomethyl group at the 3' OH position; or
   d) wherein the tagged nucleotide reversible terminators have a 2-nitrobenzyl group at the 3' OH position.

19. The method of claim 15, wherein divalent metal ions comprising catalytic ions and non-catalytic ions are included during the polymerization reaction in ratios providing reduced polymerase speed to allow sufficient time to confidently detect tags on tagged nucleotide reversible terminators (NRTs).

20. The method of claim 19, wherein catalytic divalent ions comprise Mg++ and Mn++, and non-catalytic divalent ions comprise Sr++ and Ca++.

* * * * *